United States Patent
Littman et al.

(10) Patent No.: US 11,727,668 B2
(45) Date of Patent: *Aug. 15, 2023

(54) USING CAPTURED VIDEO DATA TO IDENTIFY POSE OF A VEHICLE

(71) Applicant: Argo AI, LLC, Pittsburgh, PA (US)

(72) Inventors: Rotem Littman, Hod Hasharon (IL); Gilad Saban, Rehovot (IL); Noam Presman, Ramat Gan (IL); Dana Berman, Tel Aviv (IL); Asaf Kagan, Herzliya (IL)

(73) Assignee: ARGO AI, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,069

(22) Filed: Nov. 7, 2022

(65) Prior Publication Data

US 2023/0091928 A1 Mar. 23, 2023

Related U.S. Application Data

(63) Continuation of application No. 17/216,848, filed on Mar. 30, 2021, now Pat. No. 11,527,078, which is a
(Continued)

(51) Int. Cl.
*G06T 11/20* (2006.01)
*G06V 10/44* (2022.01)
(Continued)

(52) U.S. Cl.
CPC .......... *G06V 10/454* (2022.01); *G05D 1/0088* (2013.01); *G05D 1/0231* (2013.01);
(Continued)

(58) Field of Classification Search
CPC .... G06V 20/584; G06V 10/758; G06V 20/41; G06V 10/764; G06V 10/82;
(Continued)

(56) References Cited

U.S. PATENT DOCUMENTS 8,977,007 B1 3/2015 Ferguson et al.
9,255,805 B1 2/2016 Ferguson et al.
(Continued)

OTHER PUBLICATIONS

Carreira, Joao et al., "Quo Vadis, Action Recognition? A New Model and the Kinetics Dataset", arXiv:1705.07750v3 [cs.CV] Feb. 12, 2018.
(Continued)

*Primary Examiner* — Stephen P Coleman
(74) *Attorney, Agent, or Firm* — Fox Rothschild LLP

(57) ABSTRACT

Disclosed herein are systems, methods, and computer program products for predicting movement of an object in a real-world environment. The methods comprise: obtaining a plurality of image frames captured in a sequence during a period of time; identifying first image frames of the plurality of image frames that contain an image of at least one object with one or more turn signals; analyzing the first image frames to obtain a classification for a pose of the at least one object; using the classification of the pose of the at least one object to further obtain a type classification for at least one of the turn signals and a state classification for a state of at least one of the turn signals; and predicting movement of the at least one object based at least on the type and state classifications obtained for at least one of the turn signals.

18 Claims, 6 Drawing Sheets

Related U.S. Application Data continuation of application No. 16/535,335, filed on Aug. 8, 2019, now Pat. No. 11,003,928.

(51) Int. Cl.

| | |
|---|---|
| *G06T 7/70* | (2017.01) |
| *G06T 7/20* | (2017.01) |
| *G06T 7/00* | (2017.01) |
| *G06T 7/90* | (2017.01) |
| *G05D 1/02* | (2020.01) |
| *G05D 1/00* | (2006.01) |
| *G06V 20/58* | (2022.01) |
| *G06V 20/40* | (2022.01) |
| *G06F 18/24* | (2023.01) |
| *G06V 10/764* | (2022.01) |
| *G06V 10/82* | (2022.01) |
| *G06V 10/75* | (2022.01) |

(52) U.S. Cl.
CPC ............... *G06F 18/24* (2023.01); *G06T 7/20* (2013.01); *G06T 7/70* (2017.01); *G06T 7/90* (2017.01); *G06T 7/97* (2017.01); *G06T 11/20* (2013.01); *G06V 10/758* (2022.01); *G06V 10/764* (2022.01); *G06V 10/82* (2022.01); *G06V 20/41* (2022.01); *G06V 20/58* (2022.01); *G06V 20/584* (2022.01); *G05D 2201/0213* (2013.01); *G06T 2207/10016* (2013.01); *G06T 2207/20084* (2013.01); *G06T 2207/30244* (2013.01); *G06T 2207/30252* (2013.01); *G06T 2210/12* (2013.01)

(58) Field of Classification Search
CPC .... G06V 10/454; G06V 20/58; G05D 1/0088; G05D 1/0231; G05D 2201/0213; G06K 9/6267; G06T 7/20; G06T 7/70; G06T 7/90; G06T 7/97; G06T 11/20; G06T 2207/10016; G06T 2207/20084; G06T 2207/30244; G06T 2207/30252; G06T 2210/12
USPC ....................................................... 382/103
See application file for complete search history.

(56) References Cited

U.S. PATENT DOCUMENTS

| | | | |
|---|---|---|---|
| 9,305,223 | B1 | 4/2016 | Ogale et al. |
| 9,983,591 | B2 | 5/2018 | Micks et al. |
| 10,497,129 | B1 | 12/2019 | Cui et al. |
| 2016/0200318 | A1* | 7/2016 | Parikh ............... B60W 30/16 701/96 |
| 2018/0068191 | A1 | 3/2018 | Biemer et al. |
| 2018/0102846 | A1 | 4/2018 | Aoyama et al. |
| 2018/0129886 | A1 | 5/2018 | Ogale et al. |
| 2018/0173953 | A1 | 6/2018 | Ghata et al. |
| 2018/0373980 | A1 | 12/2018 | Huval |
| 2019/0012551 | A1 | 1/2019 | Fung et al. |
| 2019/0092318 | A1 | 3/2019 | Mei et al. |
| 2019/0332120 | A1 | 10/2019 | Choi et al. |
| 2019/0384994 | A1* | 12/2019 | Frossard ............. G06V 20/584 |
| 2020/0057917 | A1 | 2/2020 | Deng |
| 2020/0160070 | A1* | 5/2020 | Sholingar ................ G06T 7/70 |
| 2020/0196015 | A1 | 6/2020 | Pate et al. |

OTHER PUBLICATIONS

Chen, Yunpeng et al., "Multi-Fiber Networks for Video Recognition", arXiv:1807.11195v3 [cs.CV] Sep. 18, 2018.
Frossard, Davi et al., "DeepSignals: Predicting Intent of Drivers Through Visual Signals", https://www.cs.toronto.edu/-urtasun/publications/frossard_etal_icra19.pdf.
Kalogeiton, Vicky et al., "Action Tubelet Detector for Spatio-Temporal Action Localization", arXiv:1705.01861v3 [cs.CV] Aug. 21, 2017.
Li, Zhenyang et al., "VideoLSTM convolves, attends and flows for action recognition", Computer Vision and Image Understanding 166 (2018) 41-50.
Peng, Yu et al., "Combining Front Vehicle Detection with 3D Pose Estimation for a Better Driver Assistance", INTECH, International Journal of Advanced Robotic Systems, Apr. 11, 2012.
Simonyan, Karen et al., "Two-Stream Convolutional Networks for Action Recognition in Videos", Nov. 12, 2014.
Sun, Lin et al., "Human Action Recognition using Factorized Spatio-Temporal Convolutional Networks", International Conference on Computer Vision (ICCV), Dec. 2015.
Tran, Du et al., "C3D: Generic Features for Video Analysis", vlg.cs.dartmouth.edu/c3d/, Jul. 28, 2019.
Tran, Du et al., "Learning Spatiotemporal Features with 3D Convolutional Networks", arXiv:1412.0767v4 [cs.CV] Oct. 7, 2015.
Wang, X. et al., "Non-local Neural Networks", Apr. 13, 2018.

* cited by examiner

USING CAPTURED VIDEO DATA TO IDENTIFY POSE OF A VEHICLE

RELATED APPLICATIONS AND CLAIM OF PRIORITY

This patent document claims priority to, and is a continuation of, U.S. patent application Ser. No. 17/216,848 filed Mar. 30, 2021 which is a continuation of and claims priority to U.S. patent application Ser. No. 16/535,335, filed Aug. 8, 2019. The disclosures of the priority applications are fully incorporated into this document by reference.

BACKGROUND

Perception systems such as those used in autonomous vehicles seek to capture information about other objects in an environment. When the object is another vehicle, in order to predict what action the vehicle is likely to take it is important that the perception system be able to identify an active turn signal on the vehicle. Similarly, a bicyclist's hand signal may indicate a direction that the bicycle will likely turn. Other objects may exhibit similar signals indicating intended movement.

Detection of turn signals on vehicles and other objects poses several challenges. For example, with respect to vehicles, one challenge is that the position of the turn signal may vary from vehicle to vehicle. For example, lateral (side of vehicle) indicators are not required in the United States and many other countries, but in fact many vehicles do have side-mirror-mounted turn signals. Another challenge is that many countries require amber-colored signals in the front and back of the vehicle, but amber-colored signals can often appear to cameras as white. Further, turn signal lights may be relatively small, and they often blink at frequencies that are difficult for video cameras to detect.

This document describes methods and systems that are directed to addressing the problems described above, and/or other issues.

SUMMARY

The present disclosure concerns implementing systems and methods for predicting movement of an object in a real-world environment, comprising: obtaining, by a processor, a plurality of image frames captured in a sequence during a period of time; identifying, by the processor, first image frames of the plurality of image frames that contain an image of at least one object with one or more turn signals; analyzing, by the processor, the first image frames to obtain a classification for a pose of the object; using, by the processor, the classification of the pose of the object to further obtain a type classification for at least one of the turn signals and a state classification for a state of at least one of the turn signals; and predicting, by the processor, movement of the object based at least on the type and state classifications obtained for at least one of the turn signals.

The implementing systems can comprise: a processor; and a non-transitory computer-readable storage medium comprising programming instructions that are configured to cause the processor to implement a method for operating an automated system. The above-described methods can also be implemented by a computer program product comprising memory and programming instructions that are configured to cause a processor to perform operations.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
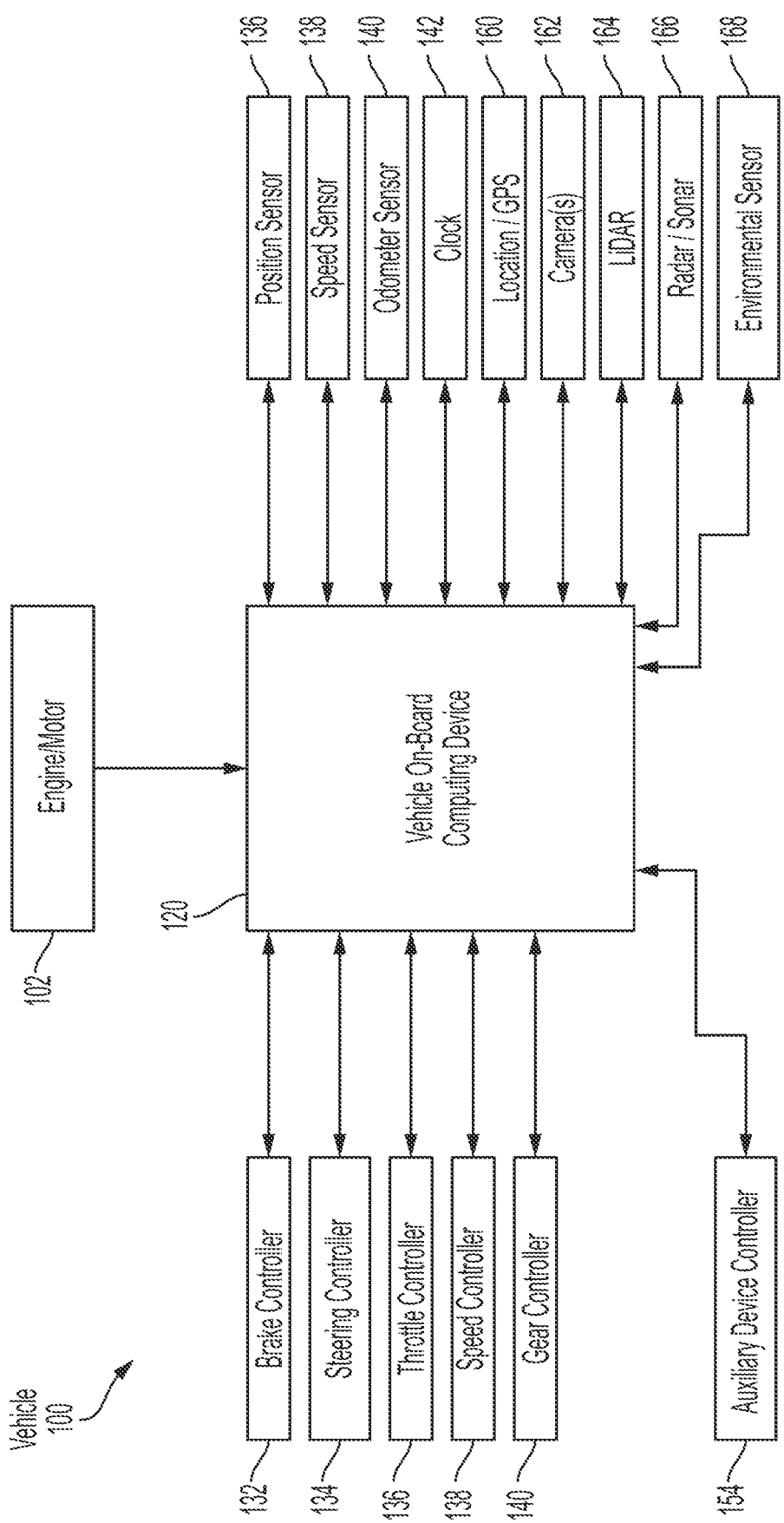
FIG. 1 illustrates example systems and components of a vehicle.

FIG. 1 illustrates an example system architecture 100 for a vehicle, such as an autonomous vehicle ("AV"). The vehicle 100 includes an engine or motor 102 and various sensors for measuring various parameters of the vehicle and its environment. If the vehicle is a gas-powered or hybrid vehicle, it will have a fuel-powered engine. If the vehicle is an electric or hybrid vehicle, then the vehicle may have an electric motor.

Operational parameter sensors that are common to both types of vehicles include, for example: a position sensor 136 such as an accelerometer, gyroscope and/or inertial measurement unit; a speed sensor 138; and an odometer sensor 140. The vehicle 100 also may have a clock 142 that the system uses to determine vehicle time during operation. The clock 142 may be encoded into the vehicle on-board computing device 120, it may be a separate device, or multiple clocks may be available.

The vehicle also will include various sensors that operate to gather information about the environment in which the vehicle is traveling. These sensors may include, for example, a location sensor 160 (e.g., a GPS device); object detection sensors such as one or more cameras 162, a LiDAR sensor system 164, and/or a radar and/or a sonar system 166. The sensors also may include environmental sensors 168 such as a precipitation sensor and/or ambient temperature sensor. The object detection sensors may enable the vehicle to detect objects that are within a given distance range of the vehicle 100 in any direction, while the environmental sensors collect data about environmental conditions within the vehicle's area of travel.

During operations, information is communicated from the sensors to an on-board computing device 120. The on-board computing device 120 analyzes the data captured by the sensors and optionally controls operations of the vehicle based on results of the analysis. For example, the on-board computing device 120 may control braking via a brake controller 132; direction via a steering controller 134; speed and acceleration via a throttle controller 136 (in a gas-powered vehicle) or a motor speed controller 138 (such as a current level controller in an electric vehicle); a differential gear controller 140 (in vehicles with transmissions); and/or other controllers.

Geographic location information may be communicated from the location sensor 160 to the on-board computing device 120, which may then access a map of the environment that corresponds to the location information to determine known fixed features of the environment such as streets, buildings, stop signs and/or stop/go signals. Captured images from the cameras 162 and/or object detection information captured from sensors such as LiDAR 164 is communicated from those sensors) to the on-board computing device 120. The object detection information and/or captured images are processed by the on-board computing device 120 to detect objects in proximity to the vehicle 100. Any known or to be known technique for making an object detection based on sensor data and/or captured images can be used in the embodiments disclosed in this document.

Figure 2:
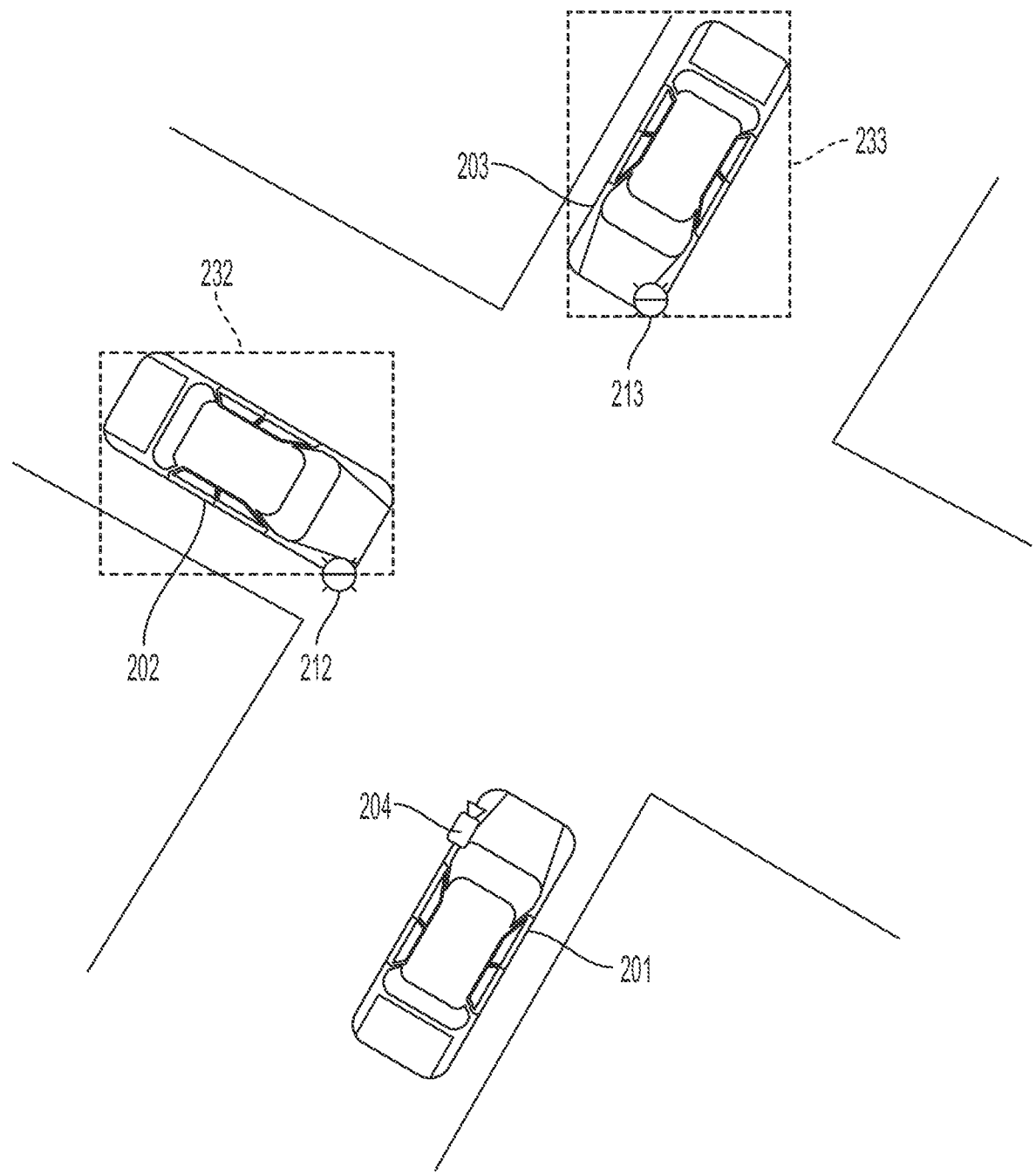
FIG. 2 illustrates how a camera-equipped vehicle may operate to detect active turn signals on other vehicles that are within the camera's field of view.

FIG. 2 illustrates an example of how a vehicle 201 (such as vehicle 100 of FIG. 1) that is equipped with one or more cameras 204 may encounter other vehicles having active turn signals in an environment. The example of FIG. 2 shows vehicle 201 along with two other vehicles 202, 203 that are approaching and/or stopped at an intersection. The first vehicle 202 has its front right turn signal 212 active, while the other vehicle 203 has its front left turn signal 213 active. Instead of other vehicles, the encountered objects may include, for example, a bicyclist with his or her left or right hand in an up position, thus providing an active left or right turn signal. Other objects also may use signals to indicate an intended action, such as turning.

Figure 3:
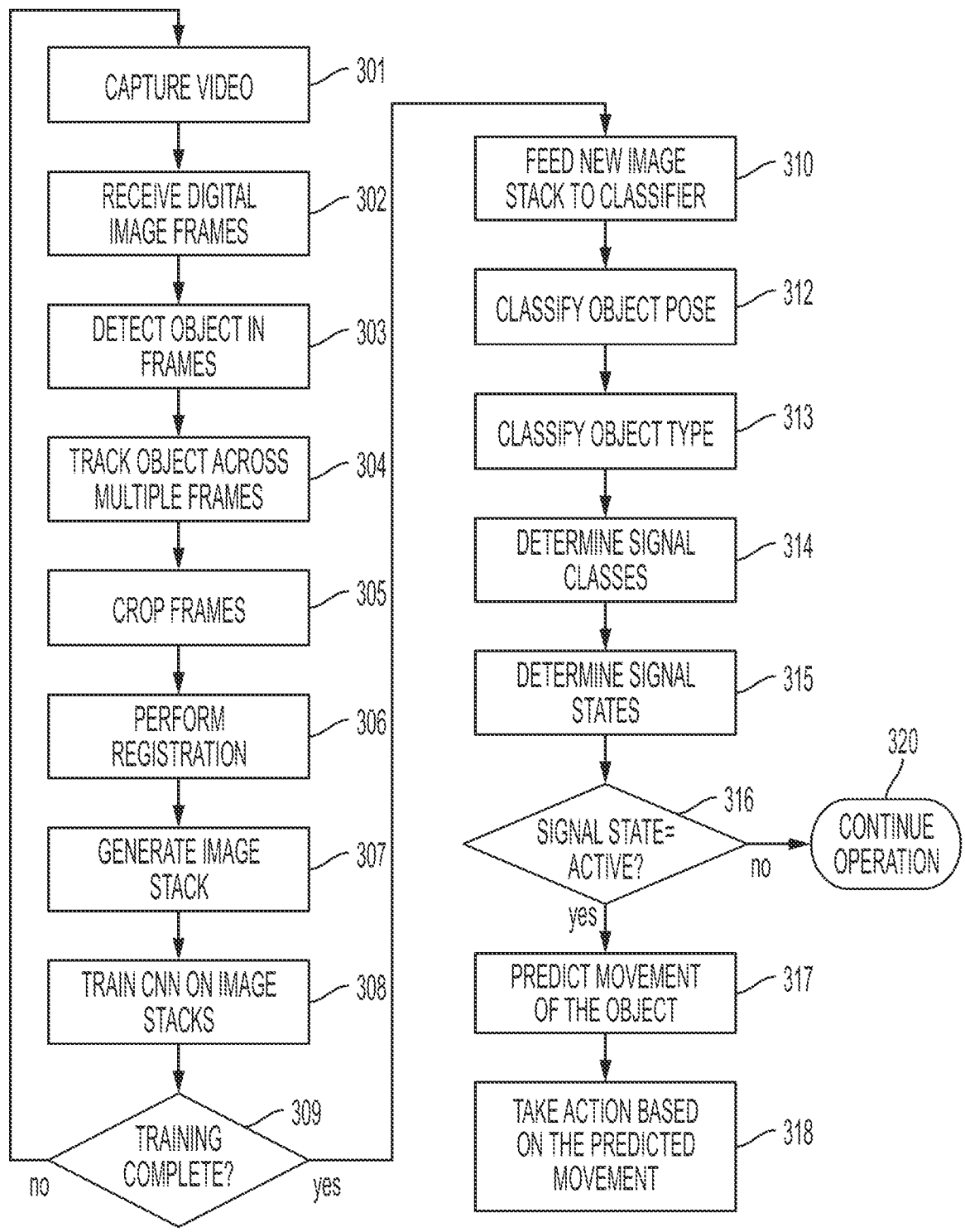
FIG. 3 illustrates an example turn signal classification process.

FIG. 3 illustrates a process by which a computing device (such as a vehicle on-board computing device and/or a remote server) may detect and classify a turn signal on an object captured in a video sequence. At 301, a video camera will capture a video that includes a group of digital image frames captured in a sequence during a period of time. Optionally, the system may include multiple cameras, such as multiple vehicle-mounted cameras, and if so the system may consider image frames captured by all of the cameras during the period of time. At 302, the computing device will receive the image frames, ideally with minimal or no delay so that the computing device can identify and classify vehicles or other objects in the captured video(s), predict movements that the objects may take (at 316), and use the predicted movements to take (or refrain from taking) various actions in operation of a vehicle (at 317).

Upon receiving a video, at 303 the system may process the video to identify image frames that contain an image of a vehicle or other object that has turn signals. The system may detect the vehicle or other object in the frame using any suitable object detection method, such as by the Mask R-CNN algorithm or another suitable algorithm that adds a bounding box and segmentation mask to each object detected in the images. FIG. 2 illustrates an example of this in which for images captured by camera 204, the processor may use Mask R-CNN to add a first bounding box 232 around the first vehicle 202 in each image that contains the first vehicle, along with a second bounding box 233 around the second vehicle 203 in each image that contains the second vehicle. A benefit of the Mask R-CNN algorithm is that it is also can determine the class of various types of objects, such as person, vehicle, bike and background. Mask R-CNN may return a score that represents a likelihood of whether an object belongs to a particular class (such as a vehicle or bicycle). In the example shown in FIG. 2, the system may determine that the object is a vehicle (or particular type of vehicle) if the score is greater than a threshold for vehicles (e.g., Mask R-CNN score≥min_mrcnn_score, in which min_mrcnn_score is the threshold for vehicles).

The system also may use object masks to handle occlusions in one or more frames of the image. For example, if one vehicle is occluding system sensors' view of another vehicle, the system may add masks to shield the occlusion (from Mask R-CNN) as an input to the 3D network (described below). The masks may be geometrically warped following registration, and added a fourth input channel to the 3D network (in addition to RGB channels). This will ensure that if the vehicle that is causing the occlusion has a flashing signal, the system will not mistakenly think that vehicle's signal belongs to the occluded vehicle.

Returning to FIG. 3, at 304 the system may track the object across a sequence of frames, and the system may eliminate frames for which the system is less confident that it has determined that the object is in the frame. Any suitable image tracking process may be used in the tracking portion of this step, such as color histogram matching or Intersection over Union (IoU) matching between each frame and its previous frame in the sequence. Three-dimensional (3D) tracking also may be used on a stack or other collection of image frames. In IoU matching, frame pairs having no bounding box intersection (i.e., bbox_IoU=0) may be discarded, thus providing a fast filtering step that helps to reduce the number of frames that will be further processed and eliminating frames that may give less confidence to the analysis. As a further filtering step, the system may, for each current frame, use a specified number of (such as five) previous frames having the highest bounding box IoU as candidates for tracking. The system may then determine the union of the current and specified number of previous frames, and it may scale and shift those frames in a 64×64 (or other size) buffer so that all of the frames are placed in the buffer as scaled masks. The system will binarize the scaled masks and determine the IoU of the binary masks. Each pair will be inserted into a maximum heap, ordered by highest IoU value. Each pair will then be added to a final matches list unless either member of the pair has already been matched. This process will be repeated until all current detections are matched.

At 306 the system may perform a registration process on the set of digital image frames that remain after the tracking process. Two-dimensional (2D) registration will cause the bounding boxes of each frame in the set to share a common location and scale within each digital image frame, and it will align the vehicles (or other tracked objects) across multiple frames so that they keep the same scale. 2D registration can be especially useful across the temporal window of an image sequence as the shape or size of the object mask changes due to occlusions, object pose change or other reasons. Any suitable 2D registration algorithm may be used, such as image-based registration or mask-based registration. An example image-based registration method may include: (1) using an algorithm such as ORB (Oriented fast and Rotated Brief), which can perform keypoint detection, feature extraction and keypoint descriptor matching; and (2) eliminating outliers using a process such as RANSAC (random sample consensus). An example mask-based registration may include calculating the area and center of mass of each mask, determining a scale between each pair of masks (in image pairs) by the square root of the ratio of the areas, and determining an offset as the difference of the centers of mass. As another registration method, the system may scale the digital image frames to a fixed size (such as 64×64), compute cross correlation between two adjacent frames, and take the location of the peak value as registration result. 3D tracking also may be used for registration purposes.

To save memory requirements, at 305 the system may crop each image frame to include only the bounding boxes, thus eliminating the need to store background image data or other information that will not be required for turn signal classification. Cropping may be done at any point in the process, including before and/or after tracking, before and/or after registration, and/or at other points in the process.

Figure 4:
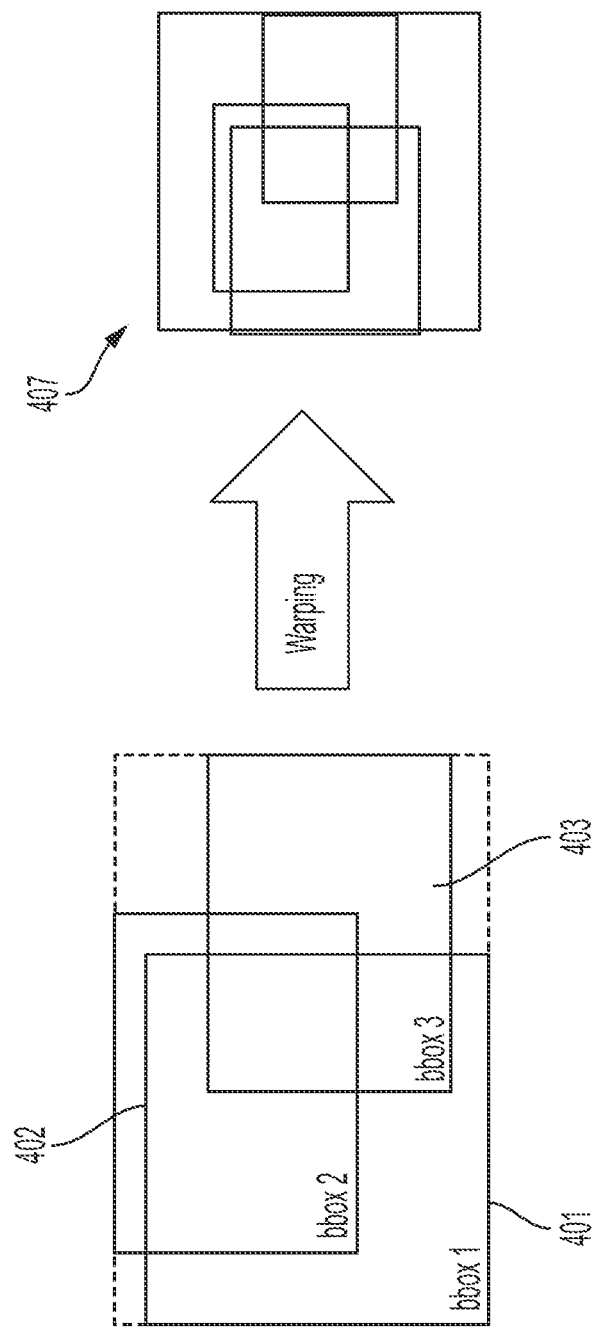
FIG. 4 illustrates a process of generating an image stack in the turn signal classification process of FIG. 3.

At 307, the system will generate an image stack by scaling and shifting the remaining registered (and optionally cropped) digital image frames to a fixed scale. An image stack is a sequence of aligned and scaled frames containing images of a single vehicle over a period of time. FIG. 4 illustrates this by way of example, in which a set of any number of bounding boxes (in this case three bounding boxes 401, 402, 403) are transformed to a common state of reference. The system will calculate the union of all bounding boxes in the stack, and it will calculate a transformation that warps the union bounding box (shown on the left side of FIG. 4) to a network input scale, yielding the image stack 407 shown on the right side of FIG. 4.

Returning to FIG. 3, at 310 the system may feed the image stack into with a classifier. At 311, the classifier may determine the state of each turn signal on the vehicle in the video sequence. Candidate signal states for each may include, for example, FLASHING (or otherwise (ACTIVE), OFF (or INACTIVE) and UNKNOWN. Candidate signal classes may include, for example, LEFT signal and RIGHT signal, as well as UNKNOWN. The exact labels may differ, so long as at least one label indicates "active" (examples: "flashing," "hand up"), and at least one other indicates "inactive" (examples: "off," "hand down"). The system may perform the classification on the image stack, directly input to the processor as pixel values (e.g., RGB values). One classifier that may be used is an optical flow followed by 3D fused two-stream network as described in Carriera et al, *Quo Vadis, Action Recognition? A New Model and the Kinetics Dataset* (2017). Alternatively, the classifier may be a 3D convolutional neural network (CNN), such as a multi-fiber 3D network. One of skill in the art will recognize that a multi-fiber 3D network can be used for video recognition, as it has been suggested in Chen et al., *Multi-Fiber Networks for Video Recognition* (2018). Another network that may be used is a factorized spatio-temporal convolutional network, such as that described in Sun et al, *Human Action Recognition using Factorized Spatio-Temporal Convolutional Networks* (2015). Another network that may be used has been described in Tran et al, *C3D: Generic Features for Video Analysis* (published at http://vlg.cs.dartmouth.edu/c3d/).

Figure 5:
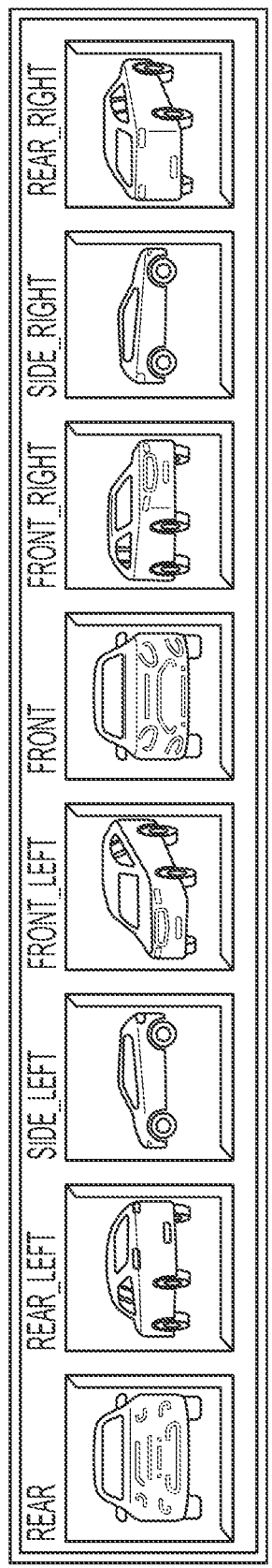
FIG. 5 illustrates example pose labels that a classifier may use.

Before performing a classification process on a new image stack, at 308 the classifier may be trained on a training set of image stacks, in which the system receives a labeled dataset of training image stack sets that includes various image stacks, and for each image stack in the set, labels including turn signal state, turn signal class, and object pose. Turn signal state labels may include, for example, OFF (or another label indicating INACTIVE, FLASHING (or another label indicating ACTIVE), or UNKNOWN. Turn signal classes may include, for example, LEFT TURN and RIGHT TURN. Optionally, the state and class labels may be combined (such as LEFT FLASHING, RIGHT OFF, etc.). Pose labels indicate the pose of the object in the image, and may include for example REAR, REAR_LEFT, SIDE_LEFT, FRONT_LEFT, FRONT, FRONT_RIGHT, SIDE_RIGHT and REAR_RIGHT. These poses are illustrated by way of example for a vehicle in FIG. 5. Other pose labels, such as UNKNOWN, may be used. The training will be an iterative process, wherein the classifier will review a group of training set stacks in a batch multiple times, refining the evaluation over each iteration.

The training may continue until training is complete at 309, which may happen when a threshold number of image stack sets and classifications have been received, or when an operator determines that the system is ready to classify new image stacks. By way of example, in one system tested by the inventors a turn signal classifier was trained on a rear signal dataset that included 63,637 frames from 649 video sequences, with labels that included B (brake signal), L (left turn signal), R (right turn signal), and O (off).

In addition to classifying the turn signal, at 312 the CNN or other classifier may classify the pose of the vehicle, and at 313 the classifier also may classify the object type (such as VEHICLE or BIKE), in each case using the image stack to make the classification.

The operations discussed above may be performed each time that a new frame is received at any step of the process. The detection of vehicles in images at 303 can be performed on a single frame, each time that a new frame is received. Tracking 304 and registration 306 each require two frames (the latest frame and its immediate prior frame, less any frames that were discarded at any step along the way). Stack creation and classification may be done on a frame set of any suitable size to capture at least one cycle of flashes by a signal, such as a stack of ten or twenty frames in a video sequence having a frame rate of 10 frames per second (fps).

In the examples described above, the system may reduce the number of frames in the stack (and crop individual frames to focus on objects within frames) to yield the image stack. In some embodiments, the classification process may further reduce the frames using a process such as late fusion to share calculations among frames—and classify frames together—thus reducing runtime. Typically, a 3D network will take, for each frame, its previous n frames, and it will classify the frame and the previous n frames together. To save computation requirements, late fusion runs two networks on each frame: (1) a "feature network" that runs on a small number K of last frames and extract features for that window; and (2) a lightweight "fusion network" that takes the features created by (1) for n-k last frames. This allows less computations since for every frame, the system will calculate the feature network on a relatively small window, and only the lightweight fusion network on the entire window of n-k frames.

At 314, the system may then use the object's classified pose to determine which turn signals are visible on the object, and at 315 the system will determine the state of each signal. To do this, the system may consider each pose to have a corresponding set of turn signals. The system may then use a lookup table or rule set that correlates various poses to turn signal positions. For example, referring to the poses of FIG. 5, the system will know that the signals shown in the REAR, REAR_RIGHT and REAR_LEFT poses include the left and right turn signals in corresponding locations in the images. The locations of those two signals will be reversed in the FRONT, FRONT_RIGHT and FRONT_LEFT poses. The SIDE_LEFT pose will include two left turn signals, while the SIDE-RIGHT post will include two right turn signals. The system may then correlates the poses to the active, classified signals in the image such as:

Pose(front)+Left(flashing), Right(off)=Signal(right)
Pose(rear)+Left(flashing), Right(off)=Signal(left)
Pose(side_left)+Any(flashing)=Signal(left)
Pose (front_left)+Left(flashing), Right(off)=Signal(right)

Additional correlations will be included in the rule set or table for various poses and signal positions.

Note that the order of steps 312-315 shown in FIG. 3 may be changed, or the steps may be performed simultaneously by the classifier.

At 316, if the system does not detect an active turn signal, the system may continue vehicle operation and data collection at 320. However, if at 316 the system determines that a signal is active and identifies which signal that is, then at 317 it may use that information to predict a direction of movement of the object. Prediction algorithms may include relatively simple rule-based algorithms, such as (for a vehicle): (a) if the vehicle's right (or left) turn signal is flashing and the vehicle is at or approaching an intersection, predict that at the intersection, the vehicle may turn in the direction of the signal; or (b) if the vehicle's right (or left) turn signal is flashing and the vehicle is traveling on a multi-lane highway in a location that is not proximate to an exit ramp or intersection, predict that the vehicle will change lanes in a direction of the signal. In practice, prediction algorithms are likely to be more complex, using trained models and not only the turn signal state and class but also other data collected from other vehicle sensors such as map data, LiDAR data and/or other sensed data.

Once the system predicts movement of the object, at 318 it may use that information to cause the system's vehicle to take an action. As with the prediction algorithms, operational action algorithms may include rule-based algorithms, such as decelerating by activating brakes and/or decreasing engine throttle if the system predicts that a turning vehicle or bicyclist will turn into the system's planned path of travel. However, in practice, action-planning algorithms are likely to be more complex.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Figure 6:
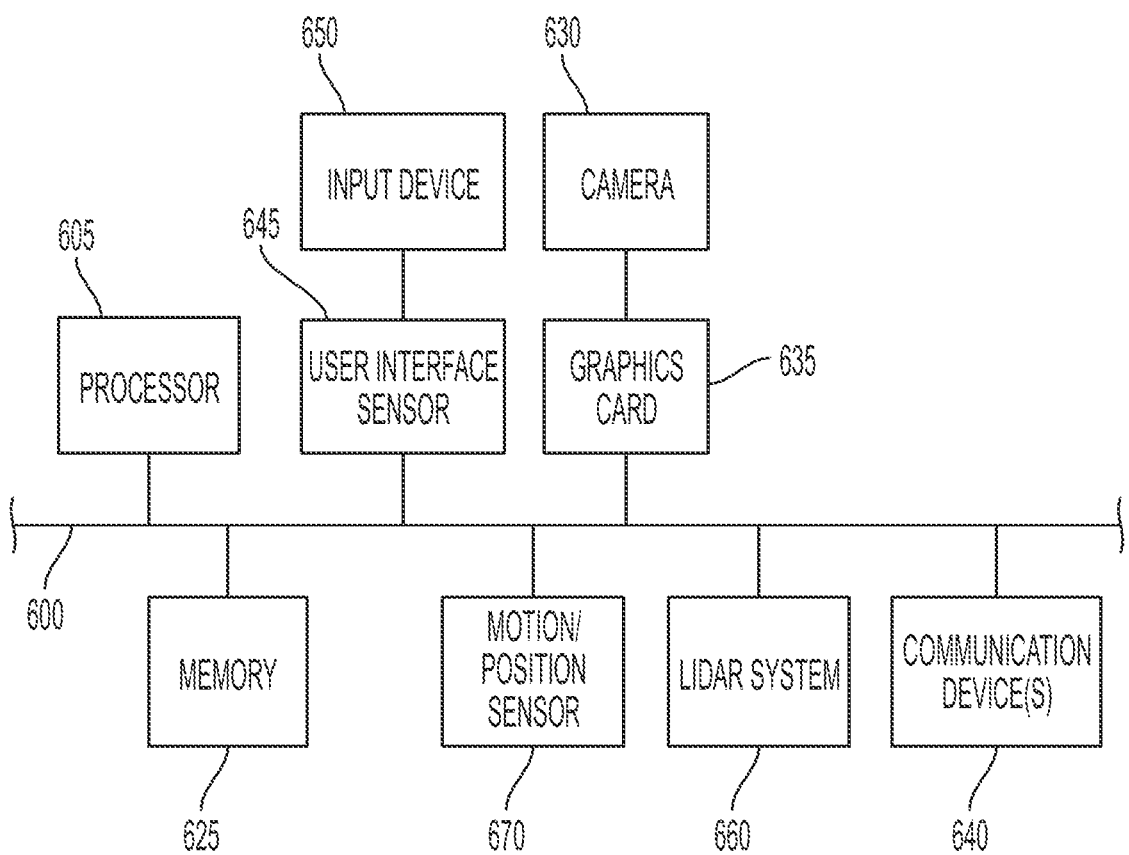
FIG. 6 is a block diagram that illustrates various elements of a possible electronic subsystem of a vehicle and/or external electronic device.

The embodiments described above are not limited to vehicle-mounted cameras and on-board processors. Roadside cameras and other cameras that have local processors and/or that are in electronic communication with one or more remote servers or other processors via a communication network may be used. FIG. 6 depicts example electronic components of a system that may be used to capture images and classify turn signals in those images, whether the system be on a vehicle, on an external monitoring and reporting systems, and/or on one or more remote servers. An electrical bus 600 serves as an information highway interconnecting the other illustrated components of the hardware. Processor 605 is a central processing device of the system, configured to perform calculations and logic operations required to execute programming instructions. By way of example, processor 605 may be an on-board processor of a vehicle's on-board computing device. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. A memory device may include a single device or a collection of devices across which data and/or instructions are stored. Various embodiments of the invention may include a computer-readable medium containing programming instructions that are configured to cause one or more processors to perform the functions described in the context of the previous figures.

Communication with external devices may occur using various communication devices 640 such as a wireless antenna, a radio frequency identification (RFID) tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard or keypad, a joystick, a touchscreen, a touch pad, a remote control, a pointing device and/or microphone. Digital image frames may be received from a camera 630 that can capture video and/or still images. A graphics processing unit (graphics card) 635 may receive and process the images to enable them to be displayed on a display device. The system also may receive data from a motion and/or position sensor 670 such as an accelerometer, gyroscope or inertial measurement unit. The system also may receive data from a LiDAR system 660 such as that described earlier in this document.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the vehicle is a drone or other aircraft, the term "street" may represent an airway and a lane may be a portion of the airway. If the vehicle is a watercraft, then the term "street" may represent a waterway and a lane may be a portion of the waterway.

A "computer" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of computers include vehicle on-board computing devices, digital cameras having processing devices, and remote servers.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

"Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The features and functions disclosed above, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A computer-implemented method for predicting movement of an object in a real-world environment, comprising:
    obtaining, by a processor, a plurality of image frames captured in a sequence during a period of time;
    identifying, by the processor, first image frames of the plurality of image frames that contain an image of at least one object with one or more turn signals;
    analyzing, by the processor, the first image frames to obtain a classification for a pose of the at least one object;
    using, by the processor, the classification of the pose of the at least one object to further obtain a type classification for at least one of the turn signals and a state classification for a state of at least one of the turn signals; and
    predicting, by the processor, movement of the at least one object based at least on the type and state classifications obtained for at least one of the turn signals;
    wherein the first image frames are associated with bounding box intersection values which are higher than bounding box intersection values associated with all other ones of the plurality of image frames.

2. The method according to claim 1, further comprising using the predicted movement of the at least one object to control operations of a vehicle.

3. The method according to claim 1, further comprising cropping each said first image frame to include only a bounding box encompassing the at least one object.

4. The method according to claim 1, wherein the classification of the pose of the at least one object comprises a rear classification, a rear_left classification, a side_left classification, a front_left classification, a front classification, a front_right classification, a side_right classification, and a rear_right classification.

5. The method according to claim 1, wherein the classification for the at least one turn signal comprises a left turn signal classification and a right turn signal classification.

6. The method according to claim 1, wherein the classification for the state of the at least one turn signal comprises an active state classification and an inactive state classification.

7. The method according to claim 1, wherein the predicting of movement of the at least one object is performed when the state classification indicates that at least one of the turn signals is in an active state rather than an inactive state.

8. A computer-implemented method for predicting movement of an object in a real-world environment, comprising:
    obtaining, by a processor, a plurality of image frames captured in a sequence during a period of time;
    identifying, by the processor, first image frames of the plurality of image frames that contain an image of at least one object with one or more turn signals;

eliminating second image frames from the plurality of image frames that are each associated with a relatively low confidence that an image of the at least one object is contained therein;
analyzing, by the processor, the first image frames to obtain a classification for a pose of the at least one object;
using, by the processor, the classification of the pose of the at least one object to further obtain a type classification for at least one of the turn signals and a state classification for a state of at least one of the turn signals; and
predicting, by the processor, movement of the at least one object based at least on the type and state classifications obtained for at least one of the turn signals.

9. The method according to claim 8, wherein the relatively low confidence is at least partially based on a bounding box intersection value for a pair of image frames.

10. A system, comprising:
a memory; and
at least one processor coupled to the memory and configured to:
obtain a plurality of image frames captured in a sequence during a period of time;
identify first image frames of the plurality of image frames that contain an image of at least one object with one or more turn signals;
analyze the first image frames to obtain a classification for a pose of the at least one object;
use the classification of the pose of the at least one object to further obtain a type classification for at least one of the turn signals and a state classification for a state of at least one of the turn signals; and
predict movement of the at least one object based at least on the type and state classifications obtained for at least one of the turn signals;
wherein the first image frames are associated with bounding box intersection values which are higher than bounding box intersection values associated with all other ones of the plurality of image frames.

11. The system according to claim 10, wherein the at least one process is further configured to use the predicted movement of the at least one object to control operations of a vehicle.

12. The system according to claim 10, wherein the at least one process is further configured to crop each said first image frame to include only a bounding box encompassing the at least one object.

13. The system according to claim 10, wherein the classification of the pose of the at least one object comprises a rear classification, a rear_left classification, a side_left classification, a front_left classification, a front classification, a front_right classification, a side_right classification, and a rear_right classification.

14. The system according to claim 10, wherein the classification for the at least one turn signal comprises a left turn signal classification and a right turn signal classification.

15. The system according to claim 10, wherein the classification for the state of the at least one turn signal comprises an active state classification and an inactive state classification.

16. A system, comprising:
a memory; and
at least one processor coupled to the memory and configured to:
obtain a plurality of image frames captured in a sequence during a period of time;
identify first image frames of the plurality of image frames that contain an image of at least one object with one or more turn signals;
analyze the first image frames to obtain a classification for a pose of the at least one object;
use the classification of the pose of the at least one object to further obtain a type classification for at least one of the turn signals and a state classification for a state of at least one of the turn signals; and
predict movement of the at least one object based at least on the type and state classifications obtained for at least one of the turn signals;
wherein the at least one process is further configured to eliminate second image frames from the plurality of image frames that are each associated with a relatively low confidence that an image of the at least one object is contained therein.

17. The system according to claim 16, wherein the relatively low confidence is at least partially based on a bounding box intersection value for a pair of image frames.

18. A non-transitory computer-readable medium that stores instructions that, when executed by at least one computing device, will cause the at least one computing device to perform operations comprising:
obtaining a plurality of image frames captured in a sequence during a period of time;
identifying first image frames of the plurality of image frames that contain an image of at least one object with one or more turn signals;
analyzing the first image frames to obtain a classification for a pose of the at least one object;
using the classification of the pose of the at least one object to further obtain a type classification for at least one of the turn signals and a state classification for a state of at least one of the turn signals; and
predicting movement of the at least one object based at least on the type and state classifications obtained for at least one of the turn signals;
wherein the first image frames are associated with bounding box intersection values which are higher than bounding box intersection values associated with all other ones of the plurality of image frames.

* * * * *